United States Patent
Dir et al.

[11] 3,995,954
[45] Dec. 7, 1976

[54] EXPOSURE SYSTEM

[75] Inventors: Gary A. Dir, 16 Gateway Road, Fairport, N.Y. 14450; Charles J. Urso, 1130 Wall Road, Webster, N.Y. 14580

[73] Assignee: Xerox Corporation, Stamford, Conn.

[22] Filed: Sept. 26, 1975

[21] Appl. No.: 617,136

[52] U.S. Cl. .......................... 355/71; 350/160 LC; 354/227; 355/8; 355/67
[51] Int. Cl.² ...................................... G03B 27/76
[58] Field of Search .......... 355/67, 71, 8; 354/227; 350/160 LC

[56] References Cited
UNITED STATES PATENTS

| | | | |
|---|---|---|---|
| 3,521,954 | 7/1970 | French | 355/71 |
| 3,722,998 | 3/1973 | Morse | 355/71 |
| 3,758,207 | 9/1973 | Letzer | 355/71 |
| 3,764,211 | 10/1973 | Morse et al. | 355/71 |
| 3,926,520 | 12/1975 | Kaufman | 355/71 |

*Primary Examiner*—Russell E. Adams, Jr.
*Attorney, Agent, or Firm*—James J. Ralabate; Michael H. Shanahan; George J. Cannon

[57] ABSTRACT

Imaging apparatus, in which an original is subjected to reflex imaging, is provided with exposure control for selectively varying the angle of incidence upon a platen of a predetermined amount of light emanating from a light source. Exposure control is provided by an electrooptic cell comprising a layer of liquid crystalline composition between two electrodes and having a reflecting surface. The exposure system of the present invention is particularly suited for use in automatic copying machines having compact scanning apparatus.

3 Claims, 6 Drawing Figures

EXPOSURE SYSTEM

BACKGROUND OF THE INVENTION

This invention relates to the reflex imaging of originals residing on a platen; and, more particularly, to the control of the intensity of the reflex image.

In automatic copying machines, the reflex mode of exposure has proven extremely suitable for use in the copying of many materials, particularly books and other types of bulky items, and has permitted the user the freedom to photocompose information at the input station of the machine. For example, U.S. Pat. No. 3,062,109 discloses a xerographic machine in which the original subject matter to be copied is supported upon a flat horizontal viewing platen and a moving lens system is employed to record an image of the original.

Attempts have been made to make compact copiers which, while occupying less space than previous copiers, nevertheless preserve the advantages found in reflex imaging of a stationary original residing on a platen. These efforts are exemplified in U.S. Pat. Nos. 3,431,053; 3,331,181; and 3,832,057. The first two patents disclose a stationary lens system and moving mirrors arranged to fold the optics in a horizontal direction thus compressing the system vertically. However, this necessitated horizontal expansion and, therefore, a sacrifice in two-dimensional compactness. The third patent successfully achieved a truly compact machine by providing for the horizontal compression of the optical system in addition to the vertical compression.

It has been found desirable, however, to provide further benefits such as the ability to simply, economically, and selectively vary the intensity of the reflex image provided by the aforementioned optical systems in automatic copying machines. For example, it is highly desirable to provide the capacity to compensate for variation in intensity of lamp output and to compensate for different document reflectivities which require different levels of illumination.

In general, liquid crystal optical states that can be utilized can be divided into those which diffusely scatter incident light and those that alter its state of polarization. The latter require the use of a linear polarizer and analyzer. Alteration of the state of polarization has been accomplished in a uniform fashion in the art by the mechanism of field effects. However, diffuse scattering effects can be achieved by the mechanisms of field and/or current effects.

Electro-optical current effects and field effects with liquid crystalline materials are known. Speaking generally, current effects are predominantly provided by utilizing nematic liquid crystalline mesophases and mixtures of nematic and optically active materials including cholesteric mesophases. U.S. Pat. Nos. 3,592,527; 3,722,998; 3,642,348 and 3,761,172 are illustrative of diffuse scattering.

In new and growing areas of technology, new methods, apparatus, compositions, and articles of manufacture are often discovered for the application of the new technology in a new mode. The present invention relates to a new and advantageous exposure system utilizing liquid crystalline diffuse scattering effects.

SUMMARY OF THE INVENTION

It is, therefore, an object of the invention to provide a novel exposure system.

It is another object of this invention to provide a novel system for controlling exposure.

It is still a further object of this invention to provide an exposure control having the capacity to compensate for variation in either lamp output intensity or light scattering and absorption due to dirty optics.

It is a further object of the present invention to provide a novel exposure system having the capability to compensate for variations in reflectivities among stationary originals which are reflex imaged.

It is another object of the present invention to provide a novel, compact exposure control particularly suited for use with compact scanning apparatus in automatic copying machines.

It is still yet a further object of the present invention to provide an exposure control which performs a beam shaping function in addition to intensity modulation for reflex imaging.

The foregoing objects and other objects are accomplished in accordance with this invention by an electro-optic cell configuration which provides beam shaping, and light scattering during reflex imaging. The electro-optic cell comprises a concave reflecting surface and a light scattering liquid crystalline composition sandwiched between two electroded surfaces; at least one of the electroded surfaces being transparent to the light used in creating the reflexed image; said one transparent electroded surface having a plurality of linearly shaped electrode stripes selectively activatable to scatter light in regions of the liquid crystalline composition between one or more of the electrode stripes and the other electroded surface. In alternate configurations, the linear stripes have edges which are not parallel but which converge toward one end of the electrode stripe so that the area of the stripe per unit length of the stripe diminishes in progression from one end of the stripe to the other end of the stripe. This configuration provides compensation for the well known fall-off in intensity near the ends of fluorescent lamps and for the known "cosine$^4$ fall-off factor." In yet another configuration, the transparent electroded surface comprises a matrix of linear stripes in the "X and Y" directions. The linear electrode stripes in the matrix can have either parallel edges or converging edges or a combination of both in order to compensate for two dimensional optical problems caused by other elements or combinations of elements in the optical system utilized in the copying apparatus.

The advantages of the present invention are readily apparent upon considering the saving of space, the elimination of mechanical complexity and the additional capabilities provided over the prior mechanical compensation for the aforementioned problems. For example, mechanical "bow-ties" are currently utilized in machines to compensate for the cosine$^4$ fall-off factor and fluorescent lamp fall-off. Furthermore, the compensation for two dimensional optical problems by mechanical means is extremely difficult and complex. The design configurations of mechanical elements and the spatial relationships required therebetween for solution of two dimensional problems severely restrict the flexibility of optical systems and the options available to the optical system designer in the choice of optical capabilities that can be designed into the system.

BRIEF DESCRIPTION OF THE DRAWINGS

For a better understanding of the invention as well as other objects and further features thereof, reference is made to the following detailed disclosure of the preferred embodiments of the invention taken in conjunction with the accompanying drawings thereof, wherein.

DESCRIPTION OF THE PREFERRED EMBODIMENTS

While the following detailed description of the preferred embodiments is directed to a compact optical scanning system utilizing the exposure control system of the present invention, it will be appreciated that this preferred embodiment is illustrative of a wide variety of specific copying machine optical system configurations which can beneficially utilize the exposure system of the present invention.

Figure 1:
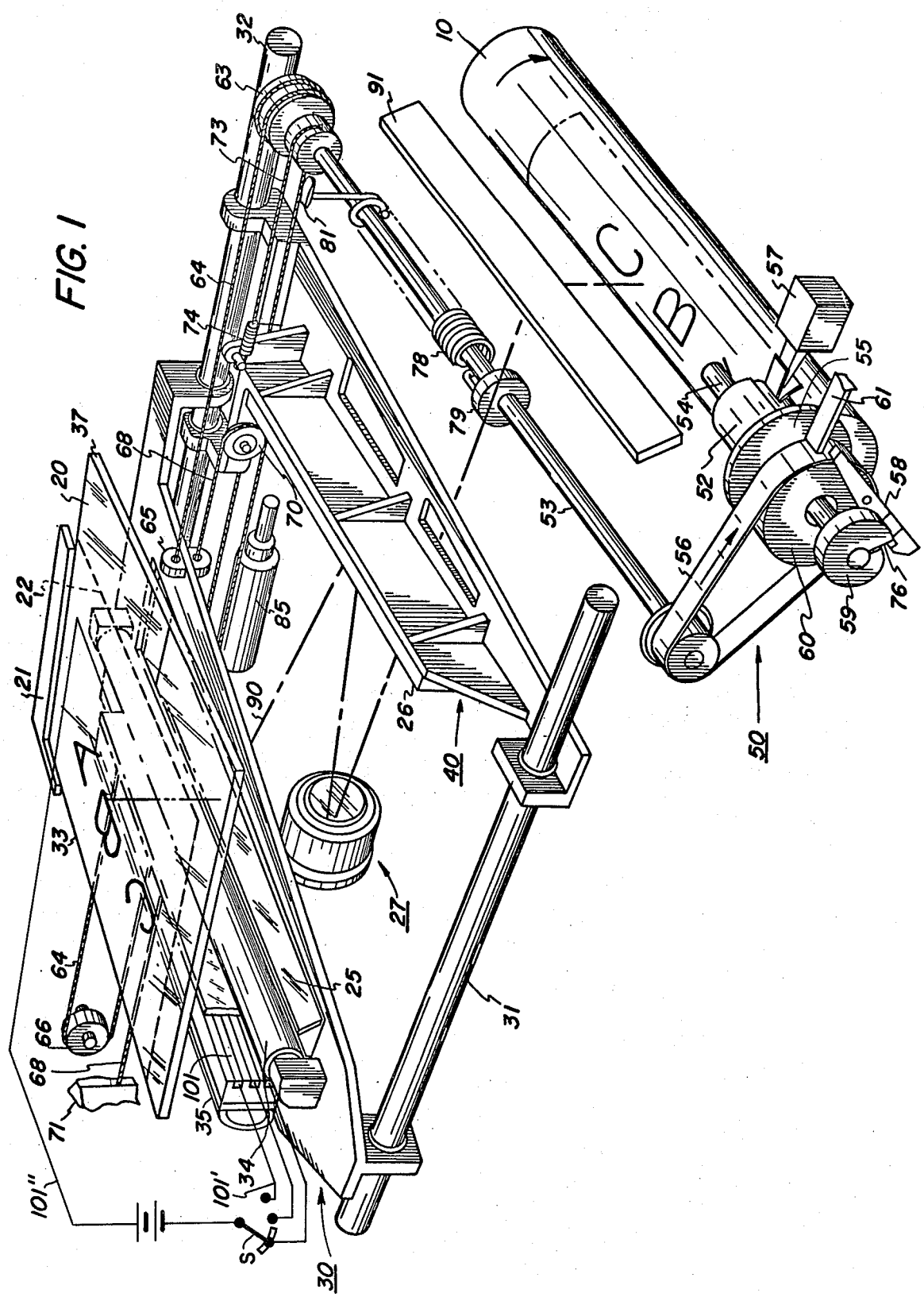
FIG. 1 is a schematic illustration of a compact scanning system incorporating the exposure control device of the present invention.

Referring now to FIG. 1, there is shown a compact scanning apparatus which placed a flowing light image of a stationary original supported upon the planar viewing platen 20 upon the photoconductive surface of a moving drum 10. The platen is preferably constructed of flat, optically clear glass mounted within a machine frame to provide a horizontal viewing station capable of conveniently holding a wide variety of original material. Guide member 21, extending along two of the platen margins, aids in the positioning of original document 22 upon the support surface of the platen.

Scanning of the stationary original is accomplished by means of a first scanning mirror 25, a second compensating mirror 26 and a stationary objective lens element 27. The scanning mirror is supported upon a carriage 30 and the carriage is adapted to move back and forth over a prescribed path of travel below the platen surfaces. Carriage 30 is slideably mounted upon two parallel aligned guide rails 31 and 32. Scanning mirror 25 extends transversely across the platen surface in substantially parallel alignment with the platen start of scan margin 33. Mounted directly behind the scanning mirror on the carriage is an aperture lamp 34 and electro-optical exposure control 35 which cooperate to illuminate a longitudinally extending incremental area upon the platen within the viewing domain of the scanning mirror. Carriage 30 is adapted to move across the lower surface of the platen at a constant rate whereby the mirror 25 scans successive illuminated incremental areas of the platen beginning at the start of scan margin 33 and terminating at the opposite side of the platen at the end of scan margin 37.

Compensating mirror 26 is provided upon moveable carriage 40. Carriage 40 is slideably mounted upon the guide rails 31 and 32. Compensating mirror 26 is positioned on the carriage 40 to receive reflected light rays emanating from the scanning mirror 25 and redirecting these light rays back towards the stationary lens element 27. Lens element 27 can comprise any suitable lens, however, a two component split Dagor system is preferred. Lens 27 is mounted in a stationary position within the boundaries described by the platen margins close to the vertical plane 28 in which the start of scan margin is located. The light entrance face of lens 27 is positioned so as to receive light rays directed thereto from the end of scan margin 37. A reflecting surface is positioned at the lens stop position to redirect the received light rays as they pass through the lens components thus simulating a conventional symmetrical system. The lens system is basically an off-axis objective which collects light from one side of the central axis and forms the image on the opposite side of the axis. This type of lens is further described in U.S. Pat. No. 3,659,922.

A pulley and cable drive system coordinates the movement of scanning mirror carriage 30 and compensating mirror carriage 40. Drive shaft 53, regulated by control mechanism 50, drives the optics. Gear 55 is operatively connected to a rotating xerographic drum 10 and arranged to rotate at a predetermined rate with drum 10. Drive shaft 54, through wrap-around clutch 52, imparts motion to gear 55. Clutch 52 is regulated by solenoid 57. Cam element 59 having a stop face 76 formed therein is affixed to the outboard end of drive shaft 54. A pawl 58 is pinned to drive pulley 60, which is mounted for free rotation upon the drive shaft 54, and adapted to periodically translate the motion of the shaft to the pulley.

In operation, at the initiation of a copying cycle, the scanning mirror and the compensating mirror are both in their respective home positions and the wrap-around clutch is disengaged. Solenoid 57 is energized to start a copying sequence, pulling a latch (not shown) energizing the wrap-around clutch. This in turn causes the shaft 54 to rotate in the direction indicated in timed relation with drum 10. The motion of the shaft 54 is imparted to the pulley 60 by cam 59 and pawl 58, which is engaging stop face 76, and translated to the optics drive shaft by means of a timing belt 56.

A two drum pulley 63 is rigidly affixed to the outboard end of the optics drive shaft 53 and adapted to turn with the shaft. A main drive cable 64 is wrapped about the large diameter drum of the pulley with one end of the cable anchored in the forward end of carriage 30 by means of an adapter 65 and the opposite end of the cable passed about a reversing pulley 66 and being similarly secured in the back end of the same carriage. This arrangement makes the scanning carriage a part of the endless loop cable system whereby the carriage responds instantaneously and positively to any movement of the optic drive shaft.

Movement of compensating mirror carriage 40 is coorindated with that of the scanning mirror carriage by means of a control cable 68. One end of the control cable is anchored in the forward end of the scanning carriage by means of adapter 65 and is passed around an idler pulley 70, journeled for rotation in the rear portion of carriage 40, and affixed to the machine frame 71. compensating mirror carriage 40 is continuously repositioned in regard to the scanning mirror carriage by the control cable as the scanning mirror is driven to the copying cycle. The rate of the scanning mirror is set equal to the peripheral speed of the xerographic drum and the motion of the compensating mirror is regulated in respect thereto so as to present a flowing light image of the original at the photoreceptor surface.

Auxiliary drive cable 73 is provided to aid in transporting the compensating mirror carriage throughout the scanning phase of each copying cycle. One end of the cable is secured to the smaller drum of the pulley 63 and the opposite end of the cable tied to the compensating mirror carriage by an extension spring 74. As the optics drive shaft is rotated in a clockwise direction, cable 73 is wound upon the smaller drum of the pulley pulling the mirror carriage from its home position towards the platen end of scan margin 37.

Typically, a rotation of cam 59 through approximately 319° will provide a sufficient angular displacement of the optics drive shaft to move the scanning mirror and the compensating mirror through the entire scanning phase of the copy cycle. After 319° rotation, pawl 58 contacts striker bar 61 which disengages the pawl from stop face 76 thus freeing the drive pulley 60 and the optics drive shaft 53 from the input drive mechanism. The wrap-around clutch is still engaged and continues to turn cam 59 through a full 360° of rotation preparatory to initiation of the next subsequent copying cycle.

Wind-up spring 78, wrap-about optics drive shaft 53, has one end locked to the shaft by means of retainer 79 while the other spring end is secured in the machine frame 81. The spring is wound to a fully loaded condition as the shaft is rotated in a clockwise direction during the scanning phase. When the drive pulley is released after reaching 319° of rotation, the loaded spring is permitted to unwind thereby turning the optics drive shaft in an opposite or counterclockwise direction. This counterclockwise rotation causes the two mirror carriages to move back over the guide rails toward their start of scan or home positions. Dash pot 85 controls the motion of the two carriages during the final portion of the restoration phase of the copying cycle. This dash pot is arranged to physically engage the scanning mirror carriage as it approaches the home position and serves to decelerate the carriage.

At the beginning of each copying cycle, the scanning mirror is in a home position from which the mirror is capable of viewing an extended incremental area on the platen including the starter scan margin 33. As mirror 25 sweeps across the bottom surface of the platen towards the end of scan position, a continuous series of incremental areas upon the platen are scanned. The light rays of these scanned areas are reflected by the scanning mirror back toward the compensating mirror along an optical light path 90. As the scanning mirror moves from one viewing position to the next, the reflected light path 90 is correspondingly shifted and the compensating mirror 26 is continuously repositioned by means of the cable system so that each of the reflected light ray paths from the scanning mirror to the compensating mirror is intercepted by the scanning mirror and the intercepted light rays are redirected back towards the lens along a common optical axis representing the light receiving axis of the lens system. The image created by the lens is subsequently directed to mirror 91 and thereby focused upon the drum 10. By adjustment of lens conjugate and speed ratio between scanning mirror and drum surface, any magnification can be obtained.

In FIG. 1, exposure control electro-optical cell 35 is shown with a plurality of linear electrode stripes 101 in electrical connection with one polarity of a suitable voltage source V by means of electrical leads 101" and capable of being selectively electrically connected to the other polarity of voltage V by means of switch S and electrical leads 101'. Electro-optical exposure control 35 can be in any of the configurations shown in FIGS. 2, 3, and 4 and other configurations that will become obvious upon a reading of the present disclosure.

In operation, electro-optical exposure control 35 reflects light from aperture lamp 34 to platen 20 and thereby illuminates original document 22. Light reflecting from original document 22 strikes scanning mirror 25 and results in an imagewise exposure of the photoconductive surface of drum 10 according to the previous description of operation. When exposure control 35 is activated, light from aperture lamp 34 and reflecting from control 35 is now scattered from regions of the light scattering liquid crystalline composition under the linear, electrode stripes 101 which were selectively activated. Some of the scattered light is now reflected from original document 22 at an angle which causes the reflected light to pass by scanning mirror 25 (that is, to avoid being intercepted by mirror 25). The non-scattered light is reflected from the original document and is intercepted by scanning mirror 25. Some of the scattered light is directed beyond the boundaries of original document 22.

Thus, exposure control 35 controls the intensity of light in the reflex image or original document 22 in that the amount of light normally entering the optical system by way of scanning mirror 25 can be selectively adjusted to any desired predetermined intensity. It should be apparent to those skilled in the art that the present exposure control system can be utilized in any reflex imaging optical system. Further, the intensity of the reflex image can be further selectively varied by utilizing an exposure control cell similar to 35 as the reflecting, compensating element 26. Another advantage provided by the exposure control system of the present invention is the flexibility to compensate for the warm up behavior of lamps commonly used in reflex imaging copiers.

This behavior is characterized in an increase in output intensity from the lamps for a temporary period subsequent to turn on of the lamps until an output intensity plateau is reached. Exposure control 35 can be programmed to have more of its electrode stripes 101 activated during this transient period than after the output intensity plateau is reached so as to maintain a constant output intensity throughout the turn on time of the lamp.

Figure 2A:
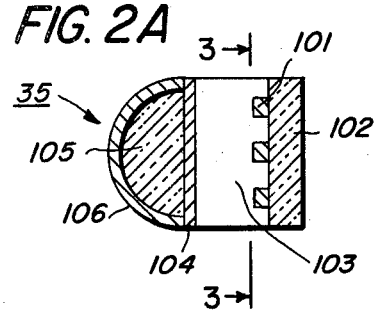
FIG. 2 is a schematic illustration of one embodiment of the exposure control device utilized in FIG. 1.
Figure 2B:
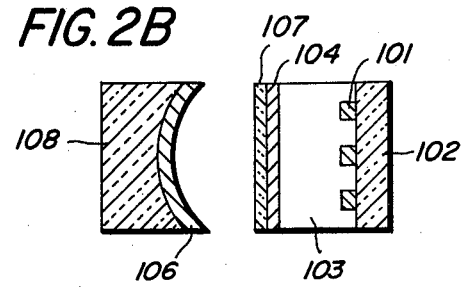

Referring now to FIG. 2, there is seen in FIG. 2A exposure control 35 comprising a glass substrate 102 having deposited thereon linear, electroded stripes 101, a light scattering liquid crystalline composition 103, and transparent electrode 104 uniformly coating a glass substrate 105 having an arcuate surface covered with reflecting coating 106. In FIG. 2B, an equivalent is shown wherein electrode 104 is provided on a planar glass substrate 107 and the beam shaping function is provided by reflective coating 106 on the concave surface of a glass substrate 108.

The electrodes may comprise any suitable conductive material. Typical suitable conductive materials include metals such as platinum, silver, tin, aluminum, gold, copper, indium, and gallium; conductive metal oxides such as, for example, tin oxide and indium oxide; insulating substrates coated with conductive layers such as NESA glass comprising a thin coating of tin oxide over glass and commercially available from Pittsburgh Plate and Glass Company. These electrode materials may be suitably coated upon the glass substrates 102 and 104 by any known conventional techniques such as, for example, vacuum evaporation. These electrode materials are provided in a very thin electrode coating so as to be transmissive to the light emanating from aperture lamp 34 in FIG. 1. The same materials as well as ordinary mirroring techniques can be utilized to provide the reflective coating 106. When the same materials are utilized to provide the transparent electrodes and the reflective coating 106, it will be appreciated that the thickness of coating 106 is sufficient to provide a highly reflective coating. Light scattering liquid crystalline composition 103 can comprise any dynamically scattering nematic liquid crystalline mesophase or any diffusely scattering mixture of nematic and cholesteric mesophases. These compositions are known in the liquid crystalline art and need not be enumerated herein. U.S. Pat. Nos. 3,592,527; 3,722,998 and 3,761,172 enumerate many such compositions and these patents are hereby expressly incorporated by reference. With uniform illumination of control device 35 by aperture lamp 34, the same effective reduction in intensity of the reflex image processed by the optical system of the copying machine will be achieved for a given percentage of electrode activation irrespective of whether the striped electrodes 101 are activated in a uniformly spaced manner across substrate 102 or in sequential manner progressing from one edge of substrate 102 to the other edge of substrate 102. That is, if, for example, there were 100 electrode stripes 101 on substrate 102, the same reduction in reflex image intensity would be achieved whether every fifth electrode were activated or if just the first 20 electrode stripes were activated. If control device 35 is non-uniformly illuminated by aperture lamp 35, selected combinations of electrode stripes can be optionally activated to render the intensity distribution in the direction of scan more uniform, but such uniformity is not required.

Figure 3:
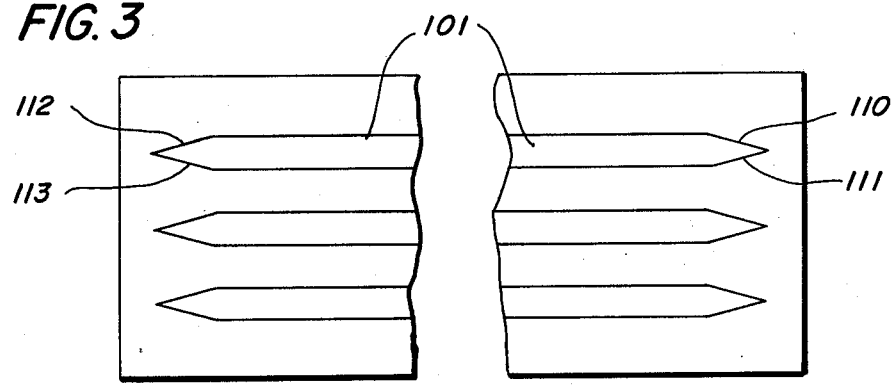
FIG. 3 is a second embodiment of the exposure control device utilized in FIG. 1.

Referring now to FIG. 3 there is seen the modification to electroded glass substrate 102 which allows for compensation for the cosine$^4$ fall off factor and fall-off of intensity near the ends of fluorescent lamps. In this embodiment, electrode stripes 101 on substrate 102 have non-parallel edges 110 and 111 and non-parallel edges 112 and 113. The appropriate pairs of lines converge towards one another at opposing edges of glass substrate 102. The amount of convergence of the appropriate pairs of edges, the spacings between electrode stripes 101, and portions of electrode stripes 101 which require parallel edges can be calculated in a relatively straight forward mathematical manner to provide an effective constant total exposure value for the entire area of electroded substrate 102. In this manner, the electroded substrate 102 can be mathematically designed to fit any particular cosine$^4$ fall-off factor; and, designed to match exactly the particular fluorescent lamp used.

Figure 4A:
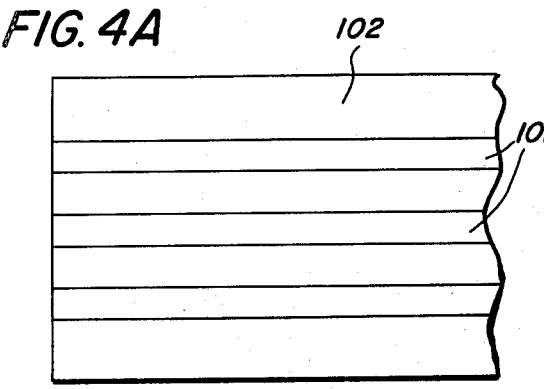
FIG. 4 is a third embodiment of the exposure control device utilized in FIG. 1.
Figure 4B:
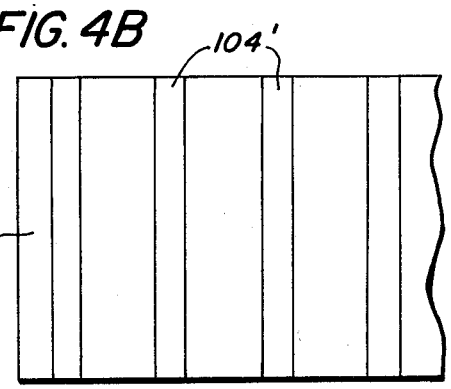

Referring now to FIG. 4, there is seen in FIG. 4A electroded stripes 101 on substrate 102. These stripes are in the X direction. On FIG. 4B, there is shown vertical Y direction electroded stripes 104' on glass substrate 107. The FIG. 4B electroded surface can be utilized for the electroded surface 107 in FIG. 2B. Furthermore, the FIG. 4B electroded stripe configuration can be utilized on the planar surface of curved glass substrate 105 in FIG. 2A. When the X and Y electrode stripes of FIG. 4 are utilized together in the exposure control 35, a matrix of addressable areas or regions of the light scattering liquid crystalline composition 103 are provided. The FIG. 4 matrix electrode stripe configuration provides the ability to address two dimensional optical problems and to solve them by selectively varying the reflex image intensity in either or both of the X and Y directions. For example, if all of the X electrodes are activated and only one of the Y direction electrodes is activated, the result will be a series of areas in the Y direction which are linear and which can approximate a solid line when the spacing between the X direction electrode stripes is minimal. On the other hand, if all of the Y direction electrode stripes are activated and only one of the X direction stripes are activated, the resulting light scattering portion of liquid crystalline composition 103 will be a series of light scattering areas in linear alignment corresponding to the X direction activated electrode.

It will be appreciated that other variations and modifications will occur to those skilled in the art upon a reading of the present disclosure. These are intended to be within the scope of the invention.

What is claimed is:

1. An exposure system for reflex imaging in a copying machine, comprising:
   a. a stationary viewing platen for supporting an original in a plane, said platen defining a first side margin boundary and an opposing side margin boundary;
   b. a lamp positioned to direct light towards said first side margin boundary;
   c. means for receiving light reflected from said original and focusing said light upon an imaging member; and
   d. means for selectively varying the intensity of the light focused upon said imaging member; said means for varying the intensity of focused light being located in the field of light emission from said lamp and comprising: a light scattering liquid crystalline composition sandwiched between two transparent electroded surfaces, said means for varying the intensity of focused light further including an arcuate reflective surface adapted to reflect emitted light between said first and opposing side margin boundaries, at least one of said transparent electroded surfaces comprising a transparent substrate overcoated with a plurality of selectively electrically connectable electrode stripes.

2. The system according to claim 1 wherein said electrode stripes have converging edges.

3. The system according to claim 1 wherein both electroded surfaces comprise electrode stripes, the electrode stripes in one electroded surface being oriented orthogonally to the electrode stripes in the other electroded surface.

* * * * *